United States Patent
Ratakonda (10) Patent No.: US 6,307,569 B1
(45) Date of Patent: Oct. 23, 2001

(54) POCS-BASED METHOD FOR DIGITAL IMAGE INTERPOLATION

(75) Inventor: Krishna Ratakonda, White Plains, NY (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/273,249

(22) Filed: Mar. 18, 1999

(51) Int. Cl.$^7$ .................................................. G06T 3/40
(52) U.S. Cl. ........................... 345/671; 345/660; 345/669
(58) Field of Search .................................. 345/130–132, 345/127, 660, 671; 382/260, 263, 264, 266

(56) References Cited

U.S. PATENT DOCUMENTS

| | | |
|---|---|---|
| 5,251,037 | 10/1993 | Busenberg . |
| 5,467,439 | 11/1995 | Lee et al. . |
| 5,469,274 | 11/1995 | Iwasaki et al. . |
| 5,481,275 | 1/1996 | Mical et al. . |
| 5,604,825 | 2/1997 | Hirota et al. . |
| 5,621,870 | 4/1997 | Shyu et al. . |
| 5,642,203 | 6/1997 | Sawano et al. . |
| 5,649,034 | 7/1997 | Sonobe . |
| 5,719,594 | * 2/1998 | Potu ..................................... 345/130 |
| 6,130,966 | * 10/2000 | Sekine et al. ......................... 382/299 |

OTHER PUBLICATIONS

Jae S. Lim, *Two–Dimensional Signal and Image Processing*, Book, 1990, pp549–553, Prentice Hall, USA.

M. Ibrahim Sezan, An Overview of Convex Projection Theory and its Application to Image Recovery Problems, Paper, 1992, pp 55–67, Ultramicroscopy 40, Elsevier Science Publishers B.V., North Holland.

Milan Sonka, Vaclav Hlavac and Roger Boyle, *Image Processing Analysis and Machine Vision*, Book, 1993, pp 88–91, Chapman & Hall Computing, U.K.

K. Ratakonda and N. Ahuja, POCS Based Adaptive Image Magnification, Paper, 1998, pp 203–207, 1998 Internationsl Conference on Image Processing, U.S.A.

* cited by examiner

*Primary Examiner*—Jeffery Brier
*Assistant Examiner*—Motilewa Good-Johnson
(74) *Attorney, Agent, or Firm*—Robert D. Varitz, PC (57) ABSTRACT

A method for enlarging a digital image includes selecting an initial image having a size N×N; determining a low frequency portion and a high frequency portion of the initial image; defining a model image having fixed bounds for each pixel therein; estimating a final image having a size pN×pN; determining a low frequency portion and a high frequency portion of the estimated final image; determining a pN×pN FFT; replacing the low frequency portion of the estimated final image with the low frequency portion of the initial image to form an intermediate estimated image; and modifying the intermediate estimated image by I-FFT to form a modified estimated image, correcting each pixel in the modified estimated image by a corresponding pixel in the model image to limit variation from the model image until the pixels of a final image are within the bounds of the model image.

20 Claims, 7 Drawing Sheets

POCS-BASED METHOD FOR DIGITAL IMAGE INTERPOLATION

FIELD OF THE INVENTION

This invention relates to digital image processing, and specifically to an improved method of image processing which results in a high quality, single enlarged image.

BACKGROUND OF THE INVENTION

The classic approach for digital image enlargement is to use direct spatial interpolation. This, however, results in image blur, as a result of bilinear interpolation; or image aliasing, as a result of pixel replication.

Resolution enhancement requires that a small image be enlarged to several times its actual size while avoiding blurring, ringing or other artifacts. Classic methods include bilinear or bi-cubic interpolation schemes, followed by an edge sharpening method, such as unsharp masking. Spatial interpolation schemes, however, tend to blur the images when applied indiscriminately. Unsharp masking, which involves subtracting a properly scaled Laplacian of the image from itself, enhances artifacts and image noise. More sophisticated schemes, such as those involving Wavelet or Fractal based techniques, have also been used. Such schemes extrapolate the signal in either the Wavelet or Fractal domain, which leads to objectionable artifacts when the assumptions behind such extrapolation are violated. It may also be noted that such extrapolatory assumptions predict and actively enhance the high frequency content within the image thus increasing any noise present in the sub-sampled image.

I have previously developed an iterative method, which improves the performance of any given base interpolation scheme while not making explicit "high frequency enhancing" assumptions. The main assumption is: interpolation is good until the interpolated data crosses an edge. Instead of making ad hoc extrapolatory assumptions, interpolation is performed in the "right fashion." Other methods have been developed which selectively interpolate across edges. Such methods, however, tend to promote false edges, which lead to noticeable artifacts. This occurs because the location of the edges in the magnified image is itself imprecise because the selectively interpolated across edge technique uses a sub-sampled image, i.e., the given small image and the algorithms make one-step decisions as to the course of action in edge-areas of the image. The iterative nature of the scheme is aimed at avoiding such an error by not committing blindly to a predetermined course of action at edge locations.

High quality image enlargement is needed in desktop imaging applications which demand high quality input and output images. In such applications, classical spatial interpolation methods do not deliver sufficient quality, especially at high enlargement factors, particularly when high-quality displays or printers are used. Blurring or aliasing artifacts become evident as images are enlarged to larger sizes and are viewed or printed on high quality displays or printers. High quality image enlargement may be utilized for high quality printing at different sizes. An enlargement algorithm may be incorporated in a printer. An enlargement algorithm may also be implemented in a scanner to improve the image resolution over the physical resolution capability of the scanner via post-processing, as is commonly done in modern day scanners.

SUMMARY OF THE INVENTION

A method for enlarging a digital input image includes the steps of: defining a model image that is of the same size (pN×pN), (p>1) as a desired large image; selecting an initial estimate of the enlarged version of the input image, wherein the input image is of size N×N and the initial estimate image is of size pN×pN for a factor of p enlargement in both dimensions; taking the N×N and pN×pN fast Fourier transform (FFT) of these two images, respectively; replacing the first N×N FFT coefficients of the FFT of the initial estimate image with the N×N coefficients of the FFT of the input image; taking the pN×pN inverse FFT (I-FFT) of the intermediate estimate to transform it to the spatial pixel domain to obtain an intermediate estimate of the desired large image; making corrections at each pixel of the resulting pN×pN intermediate estimate image such that each pixel's variation from the corresponding pixel of the model image is within predetermined lower and upper bounds, wherein these bounds vary according to pixel location, to generate the next intermediate estimate; replacing the initial estimate by the resulting intermediate estimate and repeating the above two cycles iteratively for K times and taking the final estimate resulting from K iterations as the estimate of the desired enlarged image. The first cycle corresponds to imposing the following constraint on the final estimate: Its low-frequency, N×N FFT coefficients should match with those of the input image, up to a scale factor, and the second cycle corresponds to constraining the final estimate to vary from a predetermined model image within predetermined, pixel-location dependent bounds.

It is an object of the invention to provide a method of enlarging an image using projections onto convex sets (POCS).

Another object of the invention is to provide a method of enlarging a single image.

A further object of the invention is to provide a method of enlarging an image using a priori information about the desired large image to perform a 'smart' interpolation.

Yet another object of the invention is to provide a method of enlarging an image using edge location and low-frequency information extracted from the image about the desired large image.

Another object of the invention is to extend the enlarging techniques of the invention to color images.

Still another object of the invention is to remove ringing artifacts which may appear about the edges of an enlarged image.

These and other objects and advantages of the invention will become more fully apparent as the description which follows is read in conjunction with the drawings.

DETAILED DESCRIPTION OF THE PREFERRED EMBODIMENT

The improved method described herein uses interpolation by taking into account information already known about the desired, but as yet unknown, large image. The information about the desired image needs to be estimated from available data about the original image. The estimated information then need to be manipulated into the final, enlarged, image. The prior art does not employ adaptive space varying constraints where the bound on variation from the model image varies with pixel location. The prior art does not employ a pre-de-blurring step to remove the effects of the camera optics from the input image.

The edge matching scheme of the prior implementation is replaced with a much simpler, yet robust, Canny edge detector, as described in M. Sonka, V. Hlavac and R. Boyle, *Image Processing, Analysis and Machine Vision*, Chapman and Hall, 1994, pp 88–91. This change in edge detection methodology is implemented because prior art edge detection methods are computationally cumbersome and provides multi-scale segmentation information which is not required for the method disclosed herein. The Canny edge detector is a public domain edge detection technique. Comparison between the two edge detection techniques shows no appreciable change in performance for the method described herein. The method of the invention is extended to color images, whereas the prior art utilized only grey-scale images. A scheme to remove the ringing artifacts produced by the two dimensional discrete Fast Fourier Transform (2D-FFT) at the edges of the image is disclosed.

To again summarize the preferred embodiment of the invention, a method for enlarging a digital image includes the steps of: defining a model image that is of the same size (pN×pN), (p>1) as the desired large image; selecting an initial estimate of the enlarged version of the input image, where the input image is of size N×N and the initial estimate image is of size pN×pN for a factor of p enlargement in both dimensions; taking the N×N and pN×pN fast Fourier transform (FFT) of these two images, respectively; replacing the first N×N FFT coefficients of the FFT of the initial estimate image with the N×N coefficients of the FFT of the input image; taking the pN×pN inverse FFT (I-FFT) of the intermediate estimate to transform it to the spatial pixel domain to obtain an intermediate estimate of the desired large image; making corrections at each pixel of the resulting pN×pN intermediate estimate image such that each pixel's variation from the corresponding pixel of the model image is within predetermined lower and upper bounds, where these bounds vary according to pixel location, to generate the next intermediate estimate; replacing the initial estimate by the resulting intermediate estimate and repeating the above two cycles iteratively for K times and taking the final estimate resulting from K iterations as the estimate of the desired enlarged image. The first cycle corresponds to imposing the following constraint on the final estimate: Its low-frequency, N×N FFT coefficients should match with those of the input image, up to a scale factor, and the second cycle corresponds to constraining the final estimate to vary from a predetermined model image within predetermined, pixel-location dependent bounds.

Via these constraints, both pixel-domain and frequency-domain a priori information about the actual image is introduced into the enlargement process. The first constraint uses the estimate of the information about the low frequency portion of the desired image from the low-frequency portion of the input small image, i.e., the low-frequency content of the actual enlarged image should match the low-frequency content of the input small image. Further, pixel-domain a priori information is introduced by the use of a model image and a priori bounds on the variation of the actual image from the model image. Utilization of a priori information and constraints about the actual large image makes it possible for the method of the instant invention outperform classical methods, such as bilinear spatial interpolation, that are completely blind to pixel-domain or frequency-domain characteristics of the actual image whose estimate is desired.

The method of the invention estimates and uses a priori information about the low-frequency content of the desired large image, where estimation is from the frequency content of the input, small image. If the input small image is viewed as a subsampled version of the desired large image, the low frequency content of both images should be the same. The method also estimates and uses edge and non-edge locations in the desired image, where an estimate is determined by applying edge detection to the spatially interpolated version of the input image. Edge information is used to form a model image. The model large image is used, from which the desired actual large image is constrained, to vary within a priori bounds where these bounds may change according to pixel locations. These a priori information and corresponding constraints are incorporated into the enlargement process via the formalism of projections onto convex sets (POCS).

An understanding of the prior art technique is necessary to appreciate the invention herein. The prior art scheme proceeds in three steps:

1. Obtain an interpolated image with the base interpolation scheme, which is bilinear interpolation in the method of the invention disclosed herein.
2. Obtain edge information from the interpolated image.
3. Use an iterative algorithm to reconstruct the super-resolution image.

The second step in the prior art method includes obtaining an edge mask locating edges of interest in the image. There are a number of ways to accomplish this goal, which are well known to those of ordinary skill in the art. One such technique is to find the edges from the sub-sampled, small image and then find their approximate locations in the magnified image. This leads to a staircase (or smoothing) approximation of the edges and causes visual artifacts. A better approach is to interpolate the image, with the base interpolation scheme, and then find the edges from the interpolated image. This scheme is based on the assumption that it is better to find edges directly in an interpolated image rather than finding edges in the small image and then interpolate the edge locations. This assumption bears out well in practice and is computationally simpler to implement. Segmentation, and hence edges, are found using a multi-scale segmentation technique.

As previously explained, the reconstruction technique is developed using the POCS formalism. In order to define the technique, the convex constraint sets must be defined. The solution, the reconstructed image, lies at the intersection of the following convex sets:

1. The values in the non-edge locations are constrained to vary within limits ($+\delta_1$, $-\delta_1$) their interpolated value.
2. The values in the edge locations are constrained to vary within limits ($+\delta_2$, $-\delta_2$) from their predicted value. The predicted value is found by averaging over the nearest 8-pixel neighborhood with appropriate weighting corresponding to distance. A weight of zero is given to those pixels which do not lie in the same region as the current pixel. If the edge detection technique does not provide region-wise information, i.e., it does not provide segmentation information. Region-wise information is determined by nearest neighbor interpolation. If edges are at least two pixels thick, this produces results similar to the region based technique.

3. In the Fourier domain, low frequency values are constrained to be the same as those obtained by taking the Fourier transform and scaling, by zero padding the FFT, the initial, unmagnified image.

Figure 1:
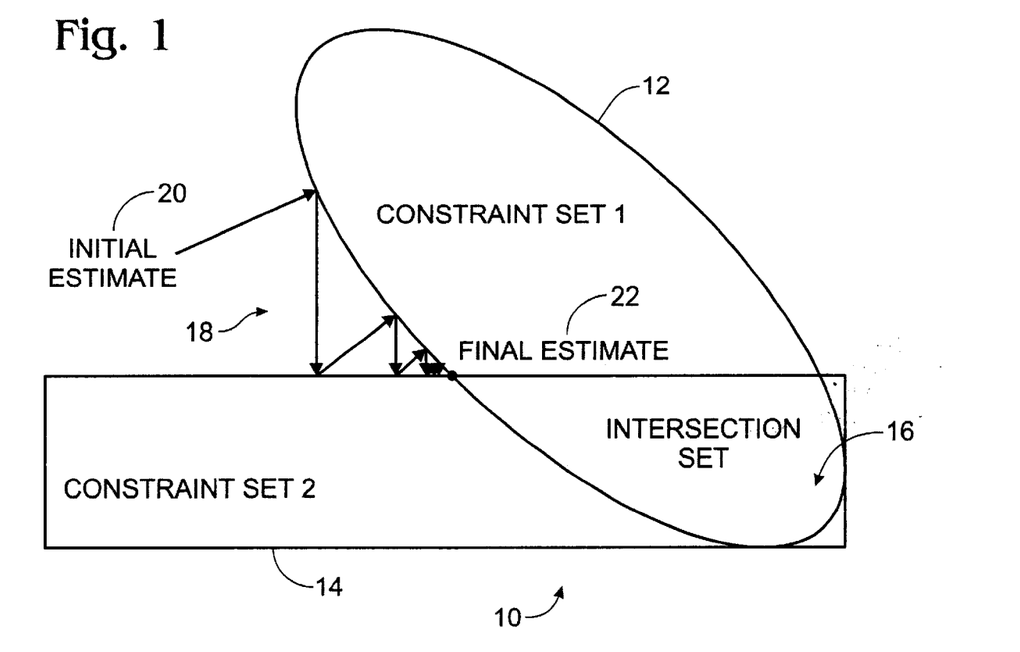
FIG. 1 depicts the principle of the projection onto convex sets algorithm for two constraints.

Imposing these constraints in the above fashion corresponds to successive projections onto convex sets (POCS) in a mathematical vector space. Successive projections onto constraint sets converge to a solution in the intersection set, i.e., a solution that satisfies the a priori constraints. This basic idea is demonstrated in FIG. 1 for two convex sets corresponding to two constraints. In FIG. 1, successive orthogonal projections of an arbitrary initial estimate onto constraint sets are depicted, generally at 10. A first constraint set 12 intersects a second constraint set 14 and forms an intersection set 16. A set of estimates 18 begins with a first, or initial, estimate 20, and is manipulated, i.e., is allowed to vary within predetermined bounds, between constraint set 1 (12) and constraint set 2 (14), resulting in a final estimate 22. In this invention the POCS algorithm has been initialized with the model image, without loss of generality.

The need for the first two constraints is evident, as previously described. They constrain the solution to be close to the model generated by an appropriate combination of the segmentation and interpolation schemes within the confidence limits set by $\delta_1$ and $\delta_2$. The first two constraints in effect limit the solution to vary within predetermined bounds from a model image that is synthesized from the interpolated image values, for non-edge pixels, and from predicted values for edge pixels. The last constraint is obtained from the fact that a sub-sampled (small) image in two dimensions preserves the low frequency content of the original (large) image. Appropriate scaling of the frequency values is necessary in order to account for the size change due to magnification. For example, a 4× magnification means that 1/16th of the Fourier coefficients from the sub-sampled image are present. In the absence of noise in the sub-sampled image and any a priori constraints on the enhanced image, all the available Fourier data is used. In the case where the original, small, image is aliased, due to motion or otherwise, some form of low pass filter needs to be applied to the Fourier data before it can be used in the constraint set.

As described above, two different control parameters are used, i.e., $\delta_1$ and $\delta_2$. The selection of these control parameters is dependent on several criteria: (1) the base interpolation scheme used effects the confidence interval $(+\delta_1, -\delta_1)$; (2) if edge sharpness is the primary criterion, $(+\delta_2, -\delta_2)$ should be large; and (3) if the magnification is large, the confidence in the edge locations is reduced and should be reflected in choosing the $\delta$ values. The following sets of $\delta$ values yield good results for 4× magnification:

1. $(\delta_1, \delta_2)=(2,5)$ usually yields good results.
2. $(\delta_1, \delta_2)=(2,3)$ reduces the improvement slightly while yielding better results if the original image quality is poor.
3. $(\delta_1, \delta_2)=(1,2)$ results in relatively small improvement but provides the least amount of artifacts in case of very poor quality originals (for example, low resolution shots obtained with the Casio QV-100, digital camera).
4. $(\delta_1, \delta_2)=(5,9)$ is to be used if edge enhancement is the primary criterion and enhancement artifacts can be tolerated.

The method of the invention simplifies the computations required to enlarge an image. As previously noted, the prior art techniques are computationally cumbersome and provide multi-scale data, which is not required in the method described herein. The Canny edge detection method results in similar performance of the method while significantly reducing the computational burden.

In order to extend the method from grey-scale to color images, an interpolatory mechanism must be specified, which mechanism may be applied to the two chroma components of the image. The given color image may be transformed into a luminance and two associated chroma components, i.e., U and V components, unless the image is already in this color format. Because the human visual system is much more insensitive to blurring in the chroma components when compared with the luminance component, a simple spatial interpolation scheme, such as bi-linear interpolation technique is used to obtain the magnified U and V components, and the POCS scheme is used only on the luminance component.

The estimated information includes low-frequency content which is estimated from the input image. The edge and non-edge locations in the final image are estimated by edge detection as applied to a bilinearly interpolated version of the input image. A model final image is allowed to vary within fixed limits, resulting in a final, enlarged image.

Figure 2:
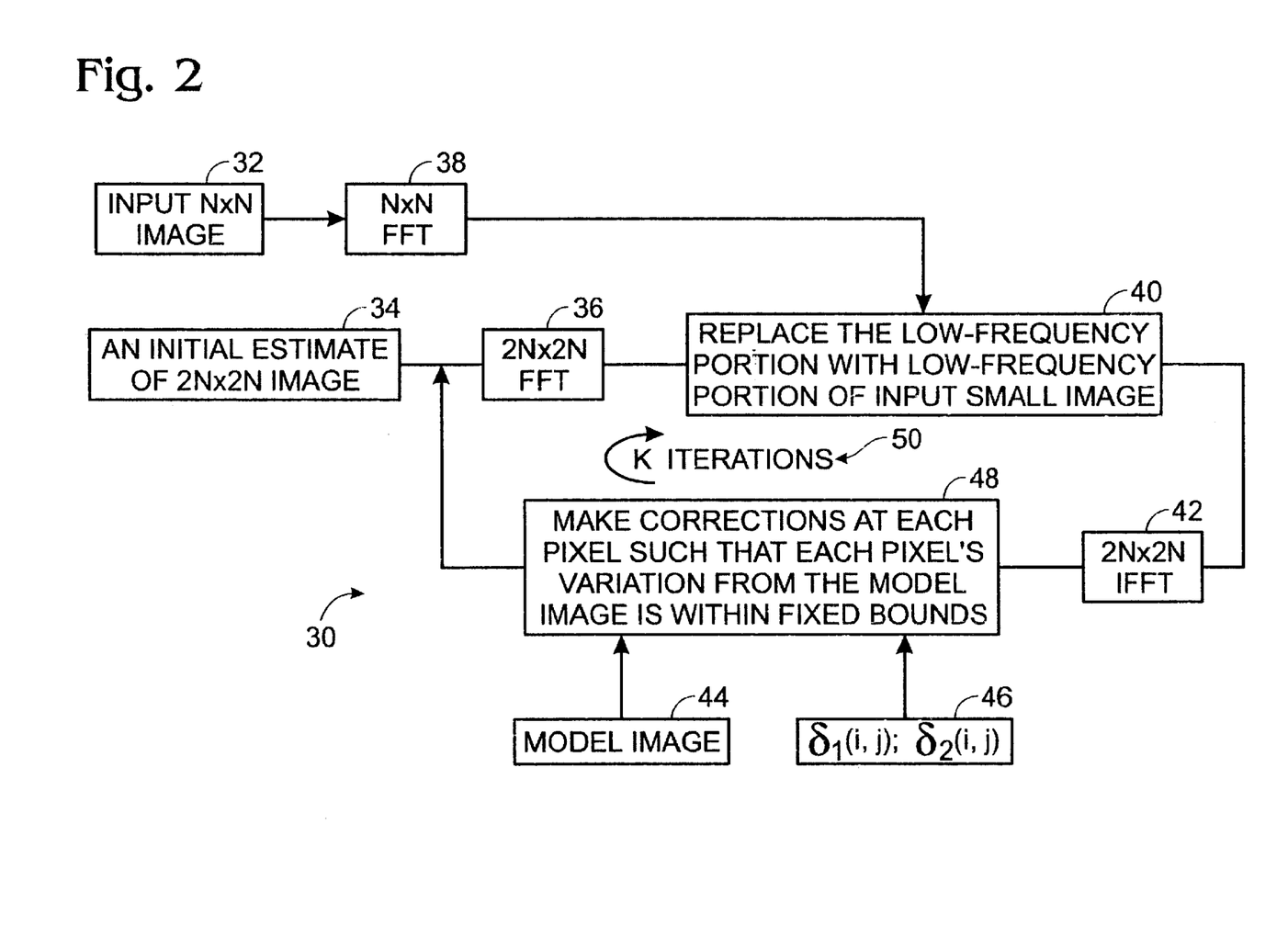
FIG. 2 is a block diagram depicting the steps of a first embodiment of the method of the invention.

Referring now to FIG. 2, a block diagram of the improved method of the invention is depicted generally at 30. Assume that an input small image 32 is N×N pixels, and that the final image is to be 2N×2N pixels. An initial estimate is made of the 2N×2N image, block 34. A 2N×2N Fast Fourier Transform (FFT) is determined, block 36. The low-frequency portion of the estimated image is replaced with the low-frequency portion of the input image, produced by applying N×N FFT to the input image, block 38, to from an intermediate estimated image in the Fourier domain, block 40, and modified by the 2N×2N I-FFT, block 42, to form a pixel domain intermediate estimated image. A model image, 44 is input to make correction at each pixel, to limit each pixel to within a predetermined limitation, as determined by control parameters 46, from the model image, where the amount of this limitation varies from one pixel to another, block 48. The process is repeated for K iterations, 50.

Model image 44 is created by bilinearly interpolating the initial image to the desired final size. An edge detection technique is applied to identify edge pixels and non-edge pixels. The results of the interpolation are saved for non-edge pixels. In the case of pixels determined to be edge pixels, the pixel values are estimated from neighboring pixels values using a local distance weighted average. As previously noted, a neighboring pixel is defined as a pixel in the eight pixels surrounding the pixel in question.

Figure 3:
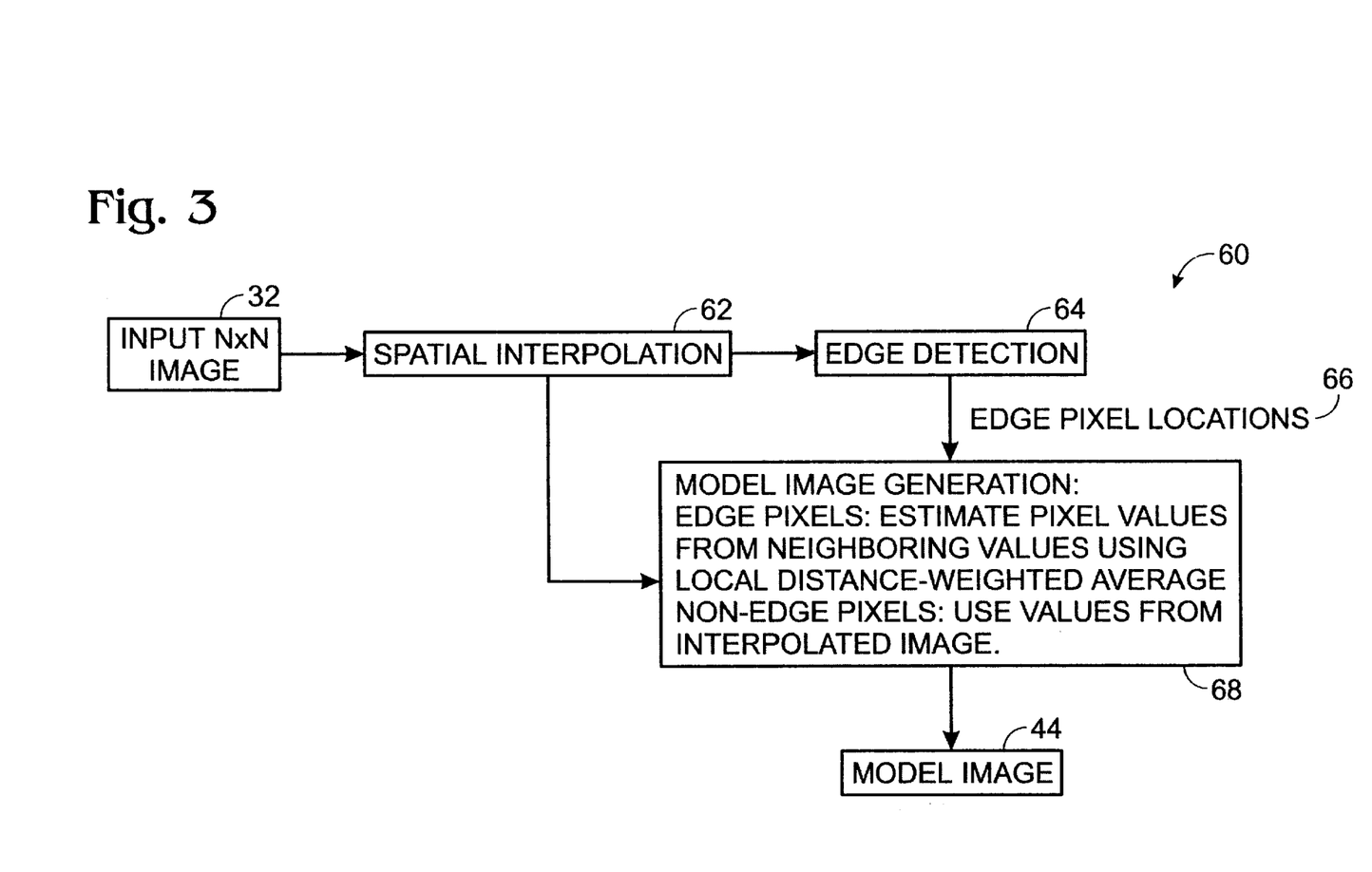
FIG. 3 is a block diagram depicting the generation of the model image.

Generation of the model image is depicted in FIG. 3, generally at 60. Input image 32 undergoes spatial interpolation, block 62. Edge detection 64, Canny edge detection in the preferred embodiment, provides edge pixel location 66, after which, model image 44 is generated, block 68.

Block 48 corrects each pixel such that each pixel's variation from the model image is within fixed bounds. This is done by comparing the intermediate estimate with the model image, pixel-by-pixel. If the absolute variation between the pixel and the model image pixel is larger than parameter, $\delta_1$, the pixel value is corrected and set equal to $\delta_1$. The parameter $\delta_2$ is used as the threshold for an edge pixel, as a larger threshold will provide a sharper edge. The present invention allows for space-varying thresholds, i.e., $\delta_1(i,j)$, and $\delta_2(i,j)$, where (i,j) defines a pixel location, i.e., the predetermined bounds are not constant for the entire image. Space varying thresholds allow imposing the "predetermined variation from a model image" constraint to spatially adapt the image depending on the pixel location. This allows flexibility in general by enabling a region-based approach where certain regions may have to be treated differently than others. An example situation is provided where such flexibility is invoked. Space varying bounds imply the use of a family of constraint sets, one set per pixel, defined by corresponding bounds $\delta_1(i,j)$ and $\delta_2(i,j)$. Hence the number of corresponding constraint sets is equal to twice the number of pixels in the enlarged image.

Figure 4:
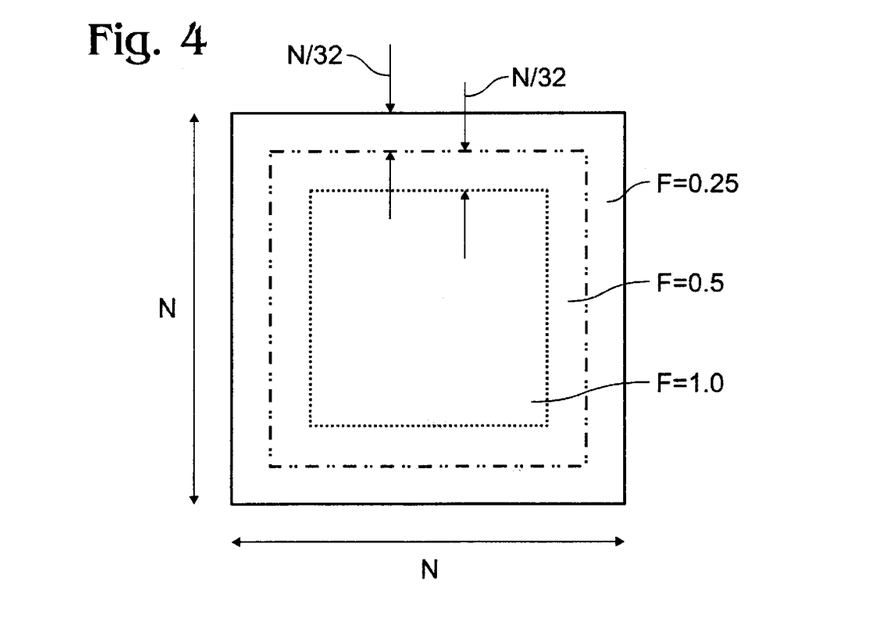
FIG. 4 depicts how bounds on variation of the actual image from the model image change depending on pixel location.

During testing of the method of the invention, ringing occurred near the edges of the image when there was a large variation of pixel intensity from one end of the image to the other, or from the top of the image to the bottom of the image, due to the periodic nature of the 2-D FFT. The ringing artifacts are particularly visible when such border regions of the image do not contain a busy structure or a dense distribution of edges. There are two techniques to solve this problem: (1) Low-pass filter the 2-D FFT obtained from the small image before using it in the constraints applied during the iterative estimation process. This has the disadvantage that the reconstructed image may be blurred by the low pass filtering; (2) Vary the $\delta$ parameters so that the original image is constrained to be close to the interpolated image at the edges, thus avoiding the ringing artifacts. This changes the first and second constraints previously described to be to spatially adaptive within the image. The second technique is preferred as it leads to a sharper image in general. In practice, both $\delta$ parameters are multiplied by the following factors, depending on which portion of the image, having an image size N×N, is being modified, as shown in FIG. 4.

1. In the outermost border, of width N/32 of the image size, by a factor F of 0.25.
2. In the inner border, of width N/32 of the image size, by a factor F of 0.5.
3. In the rest of the image by a factor F of 1.

Further, it has become apparent that a two-step approach is needed for enlargement factors larger than 4 in each of the vertical and horizontal dimensions. For an enlargement factor of 4 m, where m>1, the POCS based iterative scheme is used for an initial 4× enlargement and is subsequently followed by spatial interpolation, such as bilinear interpolation, by a factor of m. For instance, for an enlargement factor of 8×, m is equal to 2.

The effects of a camera optical system may be removed from the input small image by applying a well-known de-blurring filter, such as inverse or Wiener filtering, as described in J. S. Lim, *Two Dimensional Signal and Image Processing*," Prentice Hall, 1990, p. 549. The implementation with pre-de-blurring in the frequency domain is depicted generally at 70 in FIG. 4, which uses the same numbering scheme as in FIG. 1 for like components. In this implementation, de-blurring filter uses the point spread function of the camera optical system 72, if it is available. Otherwise, a Gaussian approximation of the point spread function is satisfactory. The frequency domain de-blurring filter 74 is then used to de-blur N×N FFT 38. The result of pre-de-blurring is increased sharpness of the enlarged image at the end of the POCS process. In case of de-blurring using inverse filtering, the FFT of the input image is divided by the FFT of the point spread function (optical transfer function). At frequencies where the FFT of the point spread function is equal to zero, the result is set to zero without attempting the division by zero.

Figure 6A:
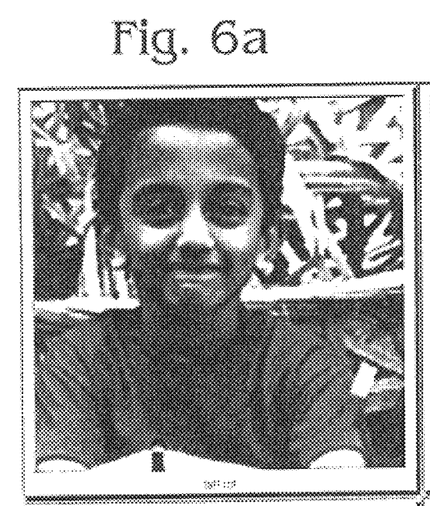
FIGS. 6, 7 and 8 are examples of images processed according to the methods of the invention and other techniques described herein.
Figure 6B:
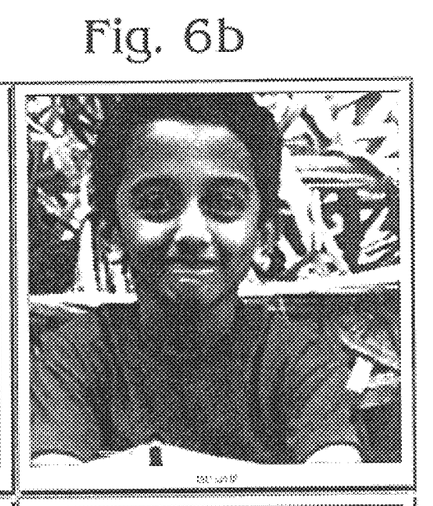
Figure 6C:
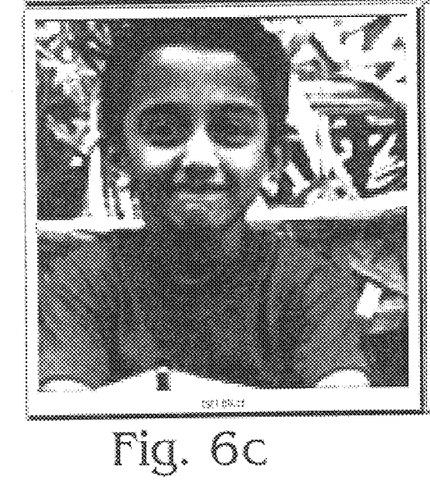
Figure 6D:
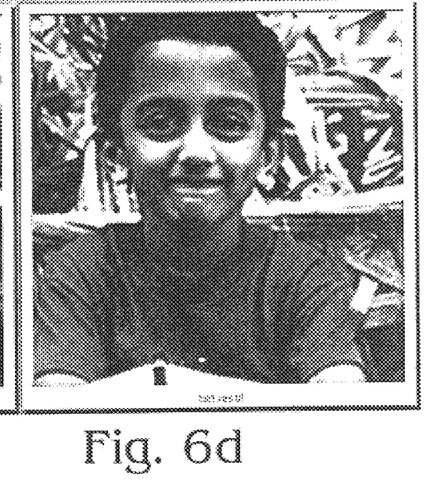

Some illustrative images are provided. In the first plate, FIG. 6, the resulting enlarged image using bilinear interpolation is depicted in FIG. 6a; bilinear interpolation followed by unsharp masking for edge enhancement is depicted in FIG. 6b; the result obtained by the method of the invention is shown in FIG. 6c; and an enlargement obtained by pixel replication is depicted in FIG. 6d. The result obtained by the method of this invention is of higher visual quality.

Figure 5:
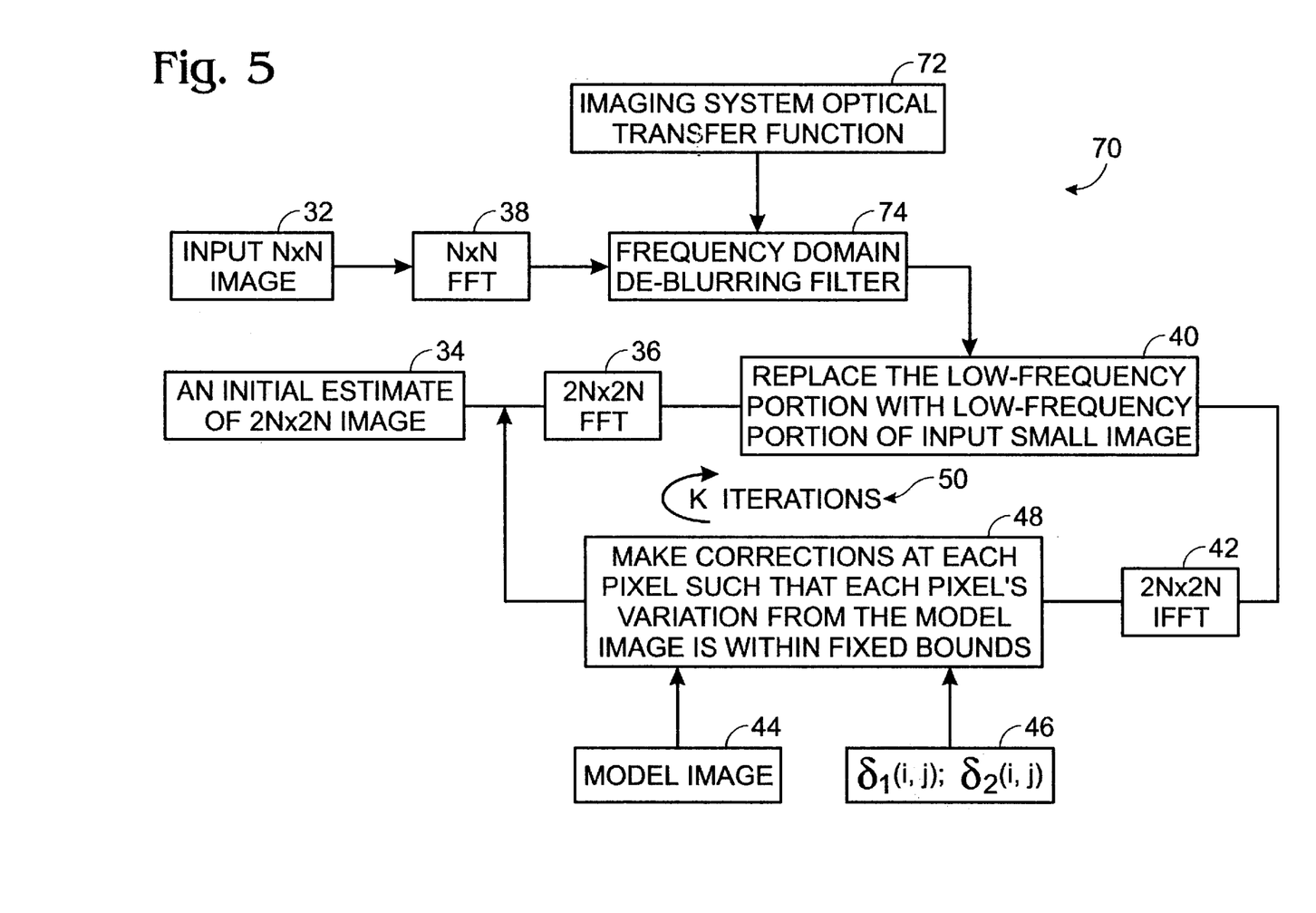
FIG. 5 is a block diagram depicting another embodiment of the method of the invention using pre-de-blurring of the input image prior to enlargement.
Figure 7A:
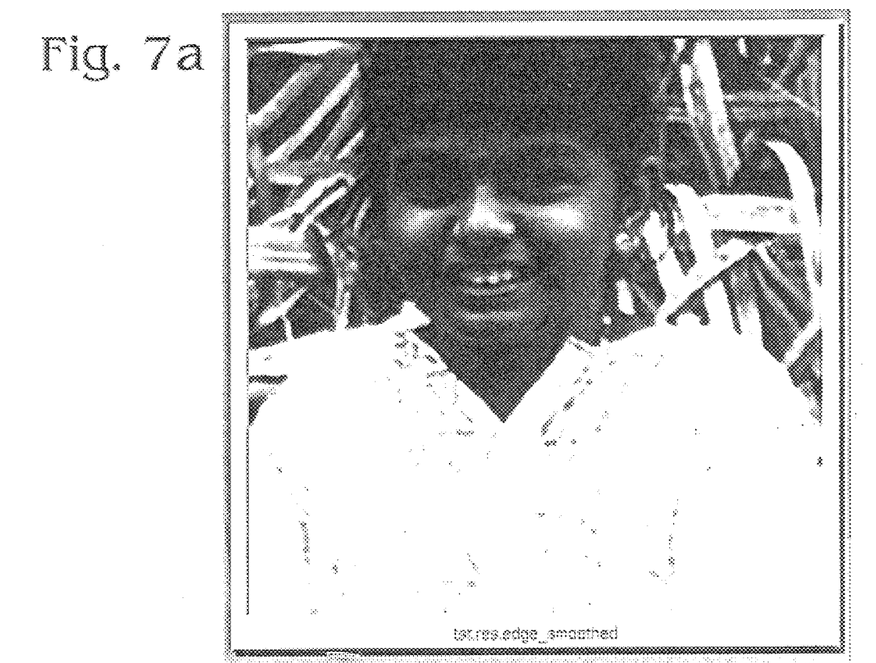
Figure 7B:
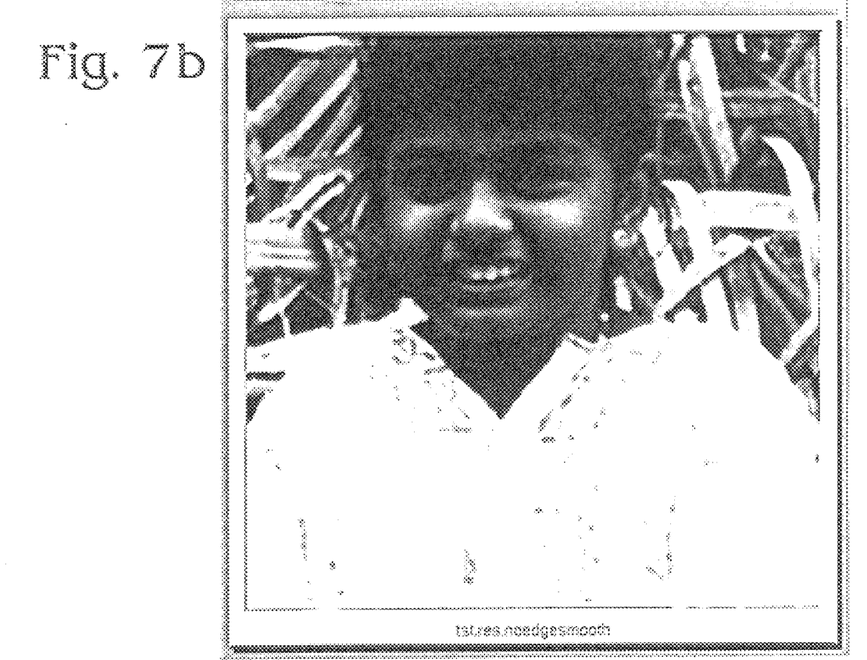

The second plate, FIG. 7, depicts the advantage of space-varying bounds. The image on the left, FIG. 7a, is obtained using a fixed set of bounds as in the prior art. The image on the right, FIG. 7b, uses the method of this invention and variable bounds of FIG. 5. The ringing artifacts that originate from image boundaries and propagate inwards with decreasing amplitude is noticeably reduced when variable bounds are utilized.

Figure 8A:
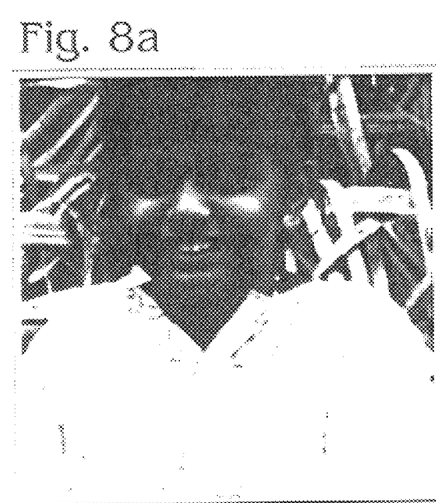
Figure 8B:
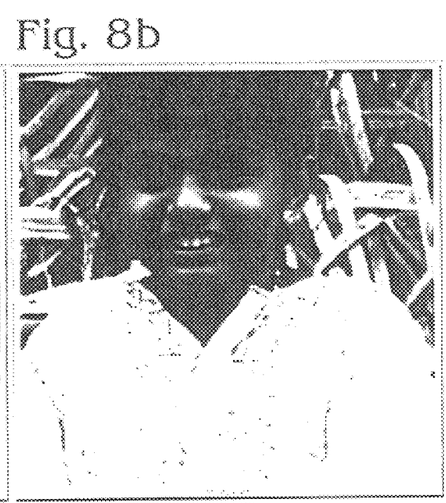
Figure 8C:
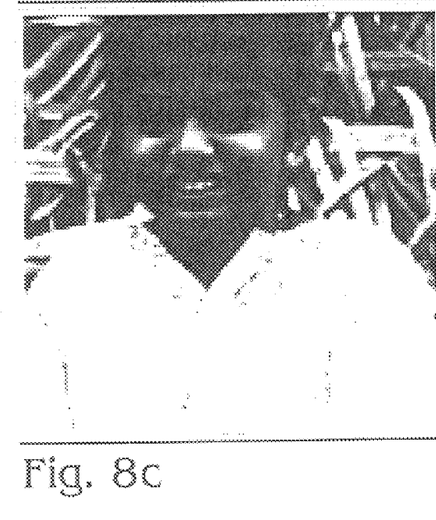
Figure 8D:
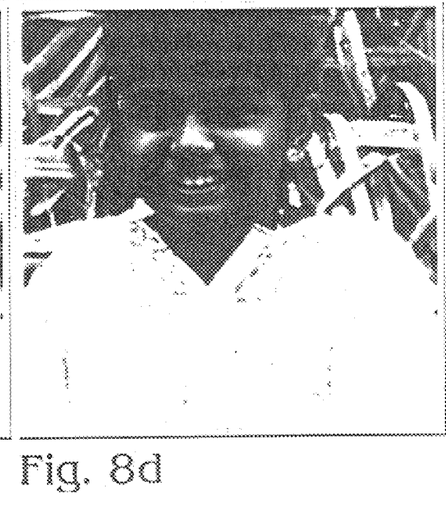

In the third plate, FIG. 8, an 8× enlargement of an image using 4× POCS plus a 2× bilinear interpolation, FIG. 8a, is an 8× bilinear interpolation; FIG. 8b is an 8× bilinear interpolation plus sharpening; FIG. 8c is a pixel representation; and FIG. 8d is an 8× image using the POCS-based method of the invention. The POCS and bilinear enlargement is superior in quality to 8× bilinear interpolation.

In practice, the number of iterations K is limited to 3 to avoid excessive computational burden. The major time consuming factor in the iterative process is finding the forward and inverse Fast Fourier transforms.

Although a preferred embodiment of the invention, and a modified embodiment thereof, have been disclosed herein, it will be appreciated that further variations and modifications may be made thereto without departing from the scope of the invention as defined in the appended claims.

I claim:

1. A method for enlarging a digital image comprising:
   selecting an initial image having a size N×N;
   determining a low frequency portion and a high frequency portion of the initial image;
   defining a model image having fixed bounds for each pixel therein;
   estimating a final image having a size pN×pN;
   determining a low frequency portion and a high frequency portion of the estimated final image;
   determining a pN×pN FFT;
   replacing the low frequency portion of the estimated final image with the low frequency portion of the initial image to form an intermediate estimated image; and
   modifying the intermediate estimated image by I-FFT to form a modified estimated image, correcting each pixel in the modified estimated image by a corresponding pixel in the model image to limit variation from the model image until the pixels of a final image are within the bounds of the model image.

2. The method of claim 1 wherein said estimating a final image is done by bilinear interpolation.

3. The method of claim 1 wherein said defining a model image includes bilinearly interpolating the initial image to size pN×pN; and detecting edge and non-edge pixels therein.

4. The method of claim 3 wherein said detecting edge pixels includes estimating edge pixels from neighboring pixel values using a local distance weighted average.

5. The method of claim 3 wherein said edge detection includes detecting edge and non-edge pixels by Canny edge detection.

6. The method of claim 1 wherein said correcting includes setting a threshold ($\delta_1$) for non-edge pixels and setting a threshold ($\delta_2$) for edge pixels and comparing the value of a pixel in the modified estimated image to the value of a corresponding pixel in the model image, and setting the value of a pixel in the modified estimated image to the appropriate threshold value if the value of the absolute variance between the pixel in the modified estimated image and model image is greater than the threshold value.

7. The method of claim 1 wherein said estimating a final image includes interpolating pixel values for chroma image components spatially and interpolating pixel values for luminance image components by POCS.

8. The method of claim 1 which includes de-blurring the input image.

9. The method of claim 1 which includes modifying the final image by spatial interpolation to generate a larger image.

10. A method for enlarging a digital input image comprising:

defining a model image that is of the same size (pN×pN), (p>1) as a desired large image;

selecting an initial estimate of an enlarged version of the input image, where the input image is of size N×N and the initial estimate image is of size pN×pN for a factor of p enlargement in both dimensions;

transforming the N×N and pN×pN images by fast Fourier transform (FFT);

replacing the first N×N FFT coefficients of the FFT of the initial estimate image with the N×N coefficients of the FFT of the input image;

transforming the pN×pN by inverse FFT (I-FFT) of the intermediate estimate to transform it to the spatial pixel domain to obtain an intermediate estimate of the desired large image;

correcting each pixel of the resulting pN×pN intermediate estimate image such that each pixel's variation from the corresponding pixel of the model image is within a predetermined lower and upper bounds, where these bounds vary according to pixel location;

generating the next intermediate estimate;

replacing the initial estimate by the resulting intermediate estimate; and repeating the above two cycles iteratively for K times and taking the final estimate resulting from K iterations as the estimate of the desired enlarged image.

11. The method of claim 10 wherein the first iterative cycle includes imposing a constraint on the final estimate such that its low-frequency, N×N FFT coefficients match with those of the input image, up to a scale factor.

12. The method of claim 10 wherein the iterative second cycle includes constraining the final estimate to vary from a predetermined model image within predetermined, pixel-location dependent bounds.

13. The method of claim 10 wherein said estimating a final image is done by bilinear interpolation.

14. The method of claim 10 wherein said defining a model image includes bilinearly interpolating the initial image to size pN×pN; and detecting edge and non-edge pixels therein.

15. The method of claim 14 wherein said edge detection includes detecting edge and non-edge pixels by Canny edge detection.

16. The method of claim 14 wherein said detecting edge pixels includes estimating edge pixels from neighboring pixel values using a local distance weighted average.

17. The method of claim 10 wherein said correcting includes setting a threshold ($\delta_1$) for non-edge pixels and setting a threshold ($\delta_2$) for edge pixels and comparing the value of a pixel in the modified estimated image to the value of a corresponding pixel in the model image, and setting the value of a pixel in the modified estimated image to the appropriate threshold value if the value of the absolute variance between the pixel in the modified estimated image and model image is greater than the threshold value.

18. The method of claim 10 wherein said repeating includes estimating a final image by interpolating pixel values for chroma image components spatially and interpolating pixel values for luminance image components by POCS.

19. The method of claim 10 which includes de-blurring the input image.

20. The method of claim 10 which includes modifying the final image by spatial interpolation to generate a larger image.

* * * * *